United States Patent [19]

Tondreau et al.

[11] 4,190,537
[45] Feb. 26, 1980

[54] WATER STORAGE CONTROL FOR REVERSE OSMOSIS SYSTEM

[75] Inventors: Raymond A. Tondreau, San Marcos; Donald T. Bray, Escondido, both of Calif.

[73] Assignee: Desalination Systems, Inc., Escondido, Calif.

[21] Appl. No.: 862,860

[22] Filed: Dec. 21, 1977

[51] Int. Cl.² .......................................... B01D 31/00
[52] U.S. Cl. .................................... 210/98; 137/544; 137/562; 210/110; 210/257.2; 210/321 R; 210/433 M
[58] Field of Search ................. 210/137, 136, 433 M, 210/321 R, 258, 257, 98, 110; 137/544, 545, 546, 562, 564.5

[56] References Cited

U.S. PATENT DOCUMENTS

| | | |
|---|---|---|
| 3,679,055 | 7/1972 | Clark et al. ........................ 210/110 |
| 3,794,173 | 2/1974 | Bray ................................. 210/257 M |
| 3,831,757 | 8/1974 | Gosset et al. ..................... 210/143 |
| 3,887,463 | 6/1975 | Bray ............................... 210/321 R X |

*Primary Examiner*—Frank A. Spear, Jr.
*Attorney, Agent, or Firm*—Clement H. Allen

[57] ABSTRACT

A reverse osmosis system employs a tank for storing permeate under a pressure which is a portion of the pressure of feed water introduced into a pressure resistant container housing a semipermeable membrane cartridge. Control means such as an automatic valve, preferably of the double diaphragm type, in the line introducing feed water into the pressure resistant container closes to shut off feed water flow when the pressure in the permeate storage tank reaches a first predetermined value, less than the feed water pressure, and re-opens to re-establish feed water flow at a second predetermined pressure lower than the first or shut-off pressure. A constricted passageway device such as a venturi in the pipe or connection between a dispensing device such as a faucet and the permeate storage tank has its throat communicating with the sensing conduit for actuating the feed water control valve. When the dispensing faucet is opened, flow of permeate through the venturi creates an amplified and drastically reduced pressure in the sensing conduit, and applies a servo or magnified actuation force to the valve in the re-open end of its control range.

8 Claims, 4 Drawing Figures

WATER STORAGE CONTROL FOR REVERSE OSMOSIS SYSTEM

BACKGROUND OF THE INVENTION

1. The Field of the Invention

This invention relates to control means for opening and closing a valve in the feed water line of a membrane separation system, actuated by pressure in a permeate storage tank.

2. The Prior Art

Many arrangements have been proposed and used by the prior art for automatically controlling operation of a reverse osmosis system dependent on the pressure in a permeate storage tank. The permeate may be transferred from the reverse osmosis module to a storage tank which contains a compressible fluid, such as air, separated from the permeate by a flexible diaphragm such as described in U.S. Pat. No. 3,493,496. If permeate is not withdrawn from the storage tank, and the reverse osmosis unit continues to operate, permeate pressure continues to rise until it reaches the feed pressure, or is relieved, for example, through a midsection tap in an elongated conduit restrictor controlling brine release, as described in U.S. Pat. No. 3,568,843. Such relief, which operates by draining off excess permeate through the brine control and disposal system, works very well, but does not shut down the reverse osmosis system, and feed water continues to flow and the excess permeate is wasted. For conservation of water, a control which shuts off the feed water flow when the permeate tank pressure reaches a predetermined control value is more desirable, for example, as shown in the U.S. Pat. Nos. 3,939,074 and 3,887,463.

Automatic valves actuated by pressure in the permeate storage tank are effective, but may at times tend to stick or bind especially at the low end of their operating range where the control range is narrow. Valves actuated by external power, such as solenoid valves, may be employed, but these require connection to a source of electric power and to an electric reversing or control switch. At the shut-off end of the range where the pressures are higher and the control more positive, automatic operation may be more satisfactory. At the re-open end of the range, however, where pressures are lower, automatic operation may be less positive. Control parts may stick and storage tank pressure may fall substantially below the desired re-open pressure before valve actuation is accomplished.

A simple automatic valve control system that would provide more positive feed water control, particularly at the re-open end of the operation range, would be valuable.

SUMMARY OF THE INVENTION

Summarized briefly, the reverse osmosis apparatus of this invention comprises a pressure resistant container housing a semipermeable membrane in the form, for example, of a so-called spiral wound cartridge. Means are employed for introducing a solute-containing pressurized feed water into the pressure resistant container, preferably at one end, while high solute content solution or brine is released preferably from the other end of the pressure resistant container, while operating pressure therein is maintained by means such as a restrictor or pressure control valve of commercially available type. Lower solute content permeate transported through the semipermeable membrane is collected as by a perforated central collector tube in the membrane cartridge and transferred to a permeate storage tank where it is temporarily stored under elevated pressure lens than that of the feed water, and which pressure rises or falls as permeate is stored in or released from the tank. A permeate dispensing device such as a faucet is connected to the storage tank for dispensing the permeate.

The automatic valve is placed in the feed water line to shut off feed water flow into the pressure resistant container when the pressure of the permeate stored in the storage tank is increased above a first predetermined value, for example, about one-half the pressure of the feed water, and to re-open to restore feed water flow when the pressure of permeate in the permeate storage tank has dropped below a second predetermined value, for example, about one-quarter of the feed water pressure. The automatic valve has control means actuated by the pressure of the water in a sensing conduit connected to the interior of the permeate storage tank. In order to prevent sticking or sluggish operation of the automatic valve when low pressure in the permeate storage tank calls for re-opening the automatic valve, a constricted passage way device such as a venturi is placed in the line or pipe connecting the faucet and the interior of the permeate storage tank, with its throat communicating with the sensing conduit whose pressure actuates the automatic valve. When the dispensing device or faucet is opened to dispense low solute content permeate, passage of such permeate through the constricted passage way device produces a temporary reduction in its throat section pressure which is communicated to the sensing conduit connected to the automatic valve. The sharply lowered pressure results in an amplified pressure drop, or difference, providing a servo action to re-open the automatic valve much more positively than if its actuation were controlled by the reduced storage tank pressure alone.

Preferably the automatic valve has a pair of spaced apart diaphragms, one diaphragm receiving the pressure from the sensing conduit and acting through a floating pushrod to force a smaller area second diaphragm against a feed water tube opening or mouth inside a compartment which communicates with the feed introduction inlet of the pressure resistant cartridge container. The ratio of the effective areas of the diaphragms and the feed water orifice determine the proportional close and re-open pressures at which the automatic valve operates.

DESCRIPTION OF A PREFERRED EMBODIMENT

Figure 1:
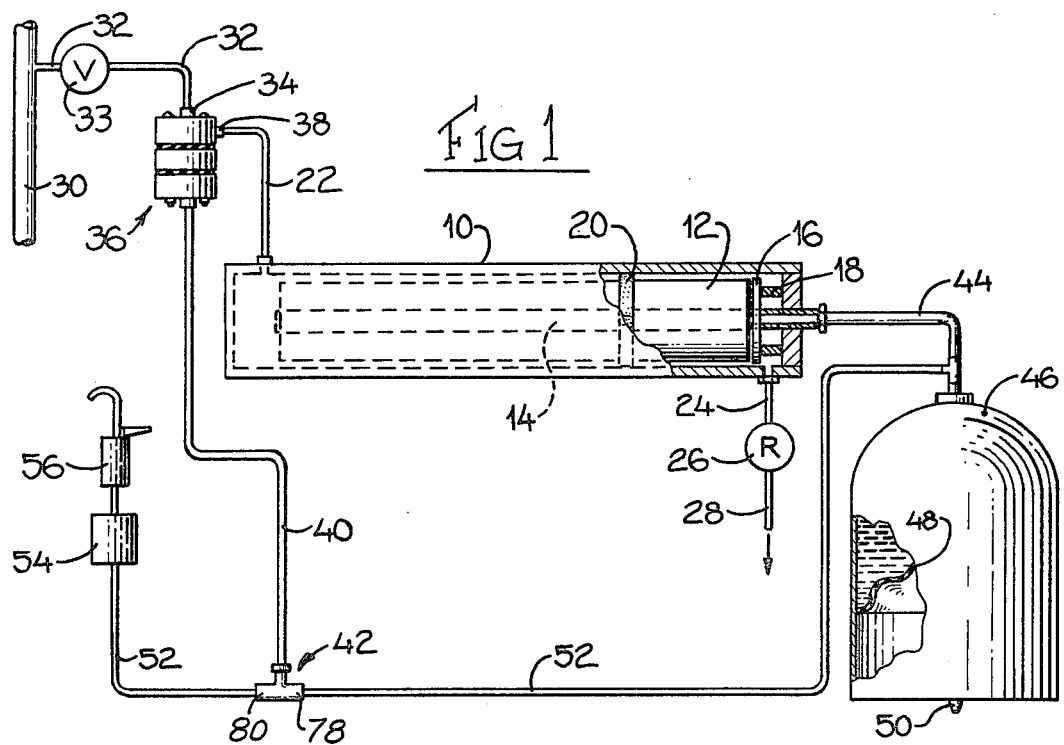
FIG. 1 shows a general view, partly diagrammatic and partly broken out, of apparatus embodying features of this invention.

Referring now to FIG. 1, the water treating apparatus, operating by reverse osmosis, comprises a tubular pressure resistant container 10, which houses a semipermeable membrane cartridge 12, which may preferably be of the so-called spiral wound design having at least one membrane leaf, spacer sheet and permeate transfer leaf spirally wound around a perforated central permeate collector 14. The imperforate end of permeate collector 14 extends from one end of cartridge 12 and passes through and is sealed to an end of pressure resistant container 10 as shown. At the end of cartridge 12 is placed perforated plate 16 against which is positioned tubular spacer 18. A sealing ring 20 surrounds cartridge 12 to prevent flow of water between its outer surface and the inner surface of pressure container 10.

A pipe 22 is connected at or near one end of pressure resistant container 10 as shown for introducing pressurized solute-containing feed water thereinto. This feed water flows longitudinally through cartridge 12 to exit as brine from pipe 24 at the other end of pressure resistant container 10, and through a restrictor 26 which may be a back pressure control valve of conventional construction, or a restricted orifice or elongated small diameter tube of suitable dimensions and operating characteristics, to release brine through pipe 28 to sewer or other disposal, while maintaining reverse osmosis operating pressure inside pressure resistant container 10.

Pressurized, solute-containing feed water is taken, for example, from a municipal supply main 30 through pipe 32 and conventional valve 33 which leads it into the inlet 34 of automatic valve 36 which will be described in greater detail hereinafter. The feed water outlet 38 of automatic valve 36 is connected to previously described pipe 22 for introducing pressure resistant feed water into pressure resistant container 10. Actuation of automatic valve 36 is controlled by a sensing throat of a constricted passageway device which may be venturi 42 whose construction will be also described in detail hereinafter. Pipe 44 connects the permeate collector 14 of cartridge 12 to the top of permeate storage tank 46 which is partitioned internally by a flexible, impermeable diaphragm 48, the space below diaphragm 48 being filled with a pressurized fluid such as compressed air at an initial pressure of 5 to 10 psi introduced through fitting 50. Pipe 52 connects the upper part of storage tank 46 to one end of venturi 42, the other end of venturi 42 being connected to the container 54 housing carbon purifier and thence to a dispensing device such as faucet 56.

Figures 2, 3:
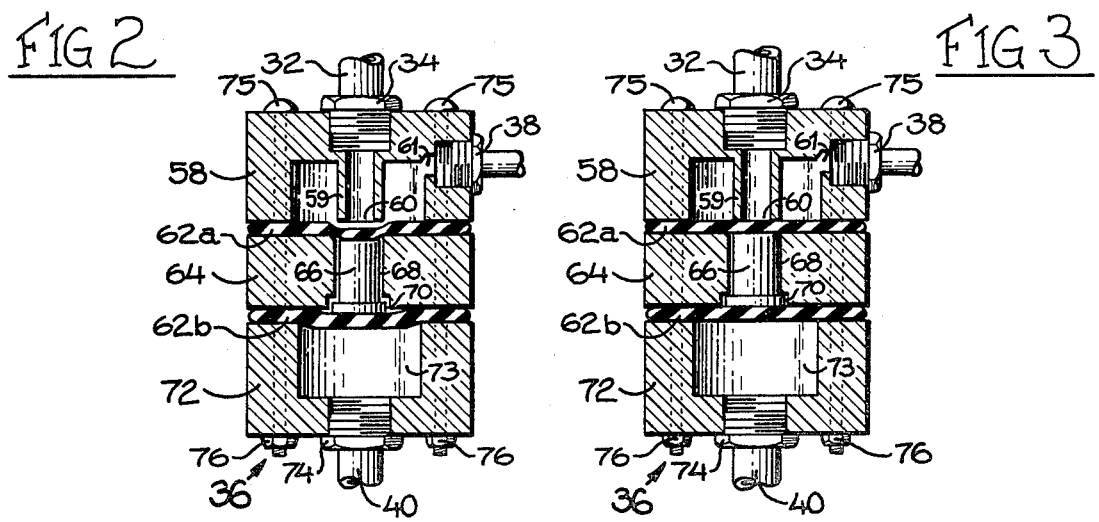
FIG. 2 shows an enlarged central vertical section of the automatic valve in the apparatus of FIG. 1, in open position.
FIG. 3 shows the automatic valve of FIG. 2 in closed position.

Referring now to FIG. 2 automatic valve 36 comprises a generally tubular upper section 58 through the closed top of which is provided inlet 34 which communicates with the interior of depending feed tube 59 having a bottom opening or orifice 60. A passageway 61 through its side communicates with outlet 38. Across the open bottom of upper section 58 of valve 36 is placed a flexible, impermeable, but strong first diaphragm 62a which, for example, be fabricated of an elastomer such as a rubber reinforced by a natural or synthetic fabric. Central section 64 of valve 36 may be characterized by a somewhat thicker wall than upper section 58 and houses a free floating pushrod 66 having a top extension 68 and a bottom extension 70. The diameter of top extension 68 will be less than that of bottom extension 70 and greater than that of the internal diameter of opening 60 of depending tube 59, for reasons discussed hereinafter. Across the bottom of central section 64 of valve 36 is placed another or second diaphragm 62b similar to previously described diaphragm 62a, pushrod 66 acting as mechanical means for transmitting force from one diaphragm to the other. Bottom section 72 of valve 36 has a closed bottom, has a central bore 73 diameter somewhat greater than the bottom section 70 of pushrod 66 and has a connector 74 through its closed bottom providing communication between its interior and sensing line 40. Bolts 75 pass through sidewalls of upper section 58, central section 64 and bottom section 72 of valve 36 and also through diaphragm 62a and 62b, and their nuts 76 are tightened to firmly maintain these elements in alignment and water-tight relationship. The effective or working areas of diaphragms 62a and 62b are dependent on the areas of the adjacent top and bottom faces of pushrod 66. For a practical working example, the area of opening 60 of tube 59 may be about 0.03 square inches, the face area of the top extension 68 of pushrod 66 may be about 0.06 square inches and the face area of the bottom extension 70 of pushrod 66 may be about 0.12 square inches. If the pressure of permeate in storage tank 58 is low, as by reason of withdrawal of permeate through dispensing device or faucet 56, valve 36 will open to allow flow of feed water in through inlet 34 and tube 59 into the interior of upper section 58 and out through outlet 38 connected by pipe 22 to the inlet of pressure resistant container 10. The unit is now operating, the feed water under pressure in pressure resistant container 10 producing permeate transported through the membrane in cartridge 12 and collected under pressure in the upper portion of storage tank 46. As more and more permeate is produced, the pressure in the permeate storage tank rises until it reaches a point where its pressure, acting over the effective area of diaphragm 62b, forces pushrod 66 in automatic valve 36 upward. This will occur when the permeate tank pressure is such that the force exerted on the bottom of pushrod 66 is sufficient to force diaphragm 62a upward against the pressure of the feed water acting on the effective area of diaphragm 62a. Upward movement of diaphragm 62a will force its surface against the lower rim of feed tube 59 shutting its opening 60, and closing off the flow of feed water from inlet 34 to outlet 38 of upper valve section 58. With the valve now closed as seen in FIG. 3, residual feed water will drain out of upper valve section 58 through the pressure resistant container 10 and out of brine release 28. It will be seen that at this point, diaphragm 62a will be held very firmly against opening 60 of tube 59 because the force originally supplied by pressure on diaphragm 62b through pushrod 66 to diaphragm 62a is now opposed by the feed line pressure over the considerably smaller area of opening 60 of feed tube 59. As permeate is withdrawn through faucet 56, the pressure is permeate storage tank 46 drops and the pressure on the underside or opposite surface of diaphragm 62b, communicated by the contained liquid pressure in sensing line 40, also drops. When the force thus applied to the effective area of diaphragm 62b because less than the force exerted by the feed water pressure exerted over the area of opening 60 of feed tube 59, diaphragm 62a will be forced away from opening 60 of tube 59, feed water will fill upper valve section 58 and will flow out through outlet 38 to pressure resistant container 10, thus re-opening the automatic valve and restarting operation of the reverse osmosis system. It will be apparent that the automatic valve is actuated at two predetermined pressures. It closes at a higher pressure to shut off the feed water flow and reopens at a lower pressure to re-establish feed water flow. The shut off pressure will be a proportion of the feed water pressure dependent on the relative effective areas of diaphragms 62a and 62b, and the reopen pressure will be dependent on the relative effective areas of opening 60 of tube 59 and diaphragm 62b. The effective areas of membranes 62a and 62b will be generally determined by the areas of top extension 68 and bottom extension 70, respectively, of pushrod 66. For example, if the area ratio of opening 60 of feed tube 59 to effective area of diaphragm 62a to effective area of diaphragm 62b is 1 to 2 to 4 and the feed water pressure into feed tube 59 is 60 psi (pounds per square inch), then the shut off pressure will be about 30 psi, and the reopen pressure will be about 15 psi in the permeate storage tank 46.

The term "effective area" employed in describing diaphragms 62a and 62b will not necessarily be their actual total areas, but will be dependent on the areas of adjacent faces of the extensions 68 and 70 of pushrod 66. The diaphragms will flex near their outside edges so that the areas contracting the pushrod extensions will be more important than their total areas.

Figure 4:
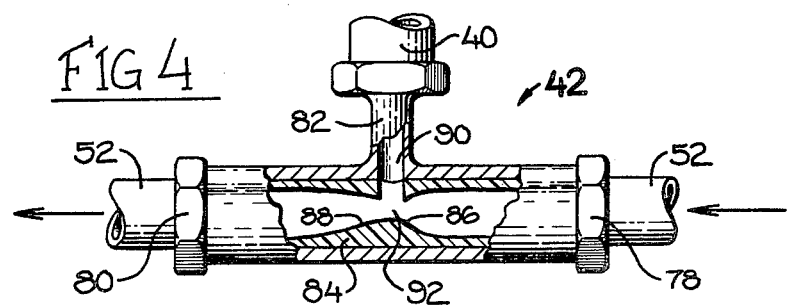
FIG. 4 shows an enlarged view, partly broken, out of the venturi which provides amplified pressure reduction in the sensing conduit actuating the automatic valve.

Referring now to FIG. 4, the venturi type constricted passageway device 42 inserted in pipe 52 comprises a housing in the shape of a "T" and which may, for example, be a brass "T" fitting with an inlet end 78, an outlet end 80 and a right angle leg 82. A venturi plug 84 may be fabricated of suitable plastic having an inlet restricted section 86 and a more gradually flaring outlet section 88. The interior of "T" leg 82 communicates through passageway 90 with the throat area 92 of plug 84. Passage of water through venturi 42 in the direction of the arrows, that is from right to left as shown, creates a low pressure area in throat section 92 which is communicated through passageway 90 in the interior of "T" leg 82, and sensing conduit 40 to inlet 74 of the lower section 72 of automatic valve 36. Thus, every time faucet 56 is opened to dispense permeate (purified water), the temporary amplified pressure drop created by the passage of this water through venturi 42 provides a servo action to produce a much reduced pressure effect on the bottom side (as illustrated) of diaphragm 62b of automatic valve 36 and corresponding more forceful downward movement of pushrod 66 and upper diaphragm 62a resulting in more positive opening of opening 60 of feed water inlet tube 59, and free flow of pressurized feed water through valve upper section 58, out valve outlet 38, through pipe 22 and into pressure resistant container 10.

In operation of the apparatus of the invention, pressurized solute containing feed water is drawn from main 30 (referring to FIG. 1) by opening conventional valve 33. The feed water flows through automatic valve 36 into pressure resistant container 10, automatic valve 36 being open on start-up because of low pressure in storage tank 46. Purified low solute content water permeate produced by semipermeable membrane cartridge 12 flows into storage tank 46, as more water flows into tank 46 the pressure therein rises compressing the air contained below its flexible diaphragm 48. When the pressure communicated by the contained water through venturi 42 and sensing conduit 40 to the underside of diaphragm 62b of automatic valve 36 is sufficient to force pushrod 66 and diaphragm 62a upward it closes opening 60 of feed tube 59 and thus automatically shuts off the feed water flow and shuts down the apparatus. When the pressure of permeate in storage tank 46 falls below the critical pressure (as hereinbefore described) due to withdrawal of purified water (permeate) through faucet 56, automatic valve 36 will open to re-establish feed water flow through pressure resistant container 10 and re-start the reverse osmosis purifying action and production of more permeate to flow into storage tank 46. Even though the pressure has not been reduced sufficiently in storage tank 46 to normally reopen automatic valve 36, servo action of venturi 42 (when permeate is withdrawn through it) will create an amplified pressure reduction in sensing conduit 40 and assured positive opening of valve 36 when the lower predetermined pressure is approached or reached.

The constricted passageway device 42 may be of any type that will produce a lowered pressure in its throat when low solute content permeate is passed through while being dispensed from the permeate dispensing device or faucet 56. It may preferably be of the venturi type as described and illustrated, but devices producing a similar effect by employing, for example, a constricted orifice in a pipe to produce a downstream lowered pressure throat area, or an expanded pipe section downstream from a smaller diameter pipe, or a section of smaller diameter pipe, may be employed.

It will be obvious that the magnitude of the pressure reduction in throat 92 of venturi 42 and connected sensing conduit 40 will depend on the speed of permeate flow from end to end through this device. Thus, if the permeate dispensing device 56 is not opened wide to dispense a substantial flow, but is only cracked to allow a dribble of permeate to pass, there will be little venturi action and temporary reduction of pressure in sensing conduit 40. This is perfectly acceptable, and indeed advantageous, because a slow withdrawal flow can be continued for some time before replenishment of permeate in storage tank 46 becomes necessary. However, when permeate dispensing device 56 is opened to permit any substantial volume flow, venturi 42 operates with comparable effect to temporarily reduce pressure in sensing conduit 40 to result in opening of valve 36 and restart of reverse osmosis production of permeate to refill storage tank 46. Even though only a small total volume of permeate is dispensed, and the valve 36 may open again shortly after permeate dispensing device 56 is closed, the on and off flow of feed water through module 10 provides a very desirable flushing action of feed water through membrane cartridge 12.

Automatic valve 36 as shown, is of especially advantageous design in that the two diaphragms and the mechanical pushrod means between them for transmitting force from one to the other are the only moveable parts and these operate without any sliding seals or "O" rings. Pushrod 66 floats freely in the compartment area between the two diaphragms and acts only for force transmission. It is not sealed to any side wall, and therefore will not bind or stick during operation as can a piston or other body moving in sealed relationship to a cylinder wall. The upper diaphragm 62a acts to receive force impulse from pushrod 66 and also, when flexed, opens and closes orifice 60. It therefore permits a dual function.

It is to be noted that for clarity of description the automatic valve parts and sections have been described as "upper", "central", and "bottom" as shown in FIGS. 2 and 3 of the drawings. The valve may, however, be arranged in any position with the described parts in the same relative location for operation as described.

We claim:

1. Reverse osmosis apparatus comprising a pressure resistant container housing a semipermeable membrane; means for introducing a solute-containing feed water into said pressure resistant container under elevated pressure; means for releasing high solute content concentrate from said pressure resistant container while maintaining operating pressure therein; means for collecting permeate separated from said feed water by transport through said semipermeable membrane and for storing said permeate in a storage tank under elevated pressure; and a dispensing device connected to said storage tank for dispensing said permeate therefrom; in which the improvement comprises:
   a. an automatic valve in said means for introducing said solute-containing feed water into said pressure resistant container;
   b. control means for closing said automatic valve when the pressure in said storage tank rises above a first predetermined pressure and for opening said automatic valve when the pressure in said storage tank falls below a second predetermined pressure below said first predetermined pressure, said control means being actuated by the liquid pressure in a sensing conduit between said valve and the interior of said storage tank; and,
   c. a constricted passageway device comprising; a tubular body, having an inlet end connected to said storage tank and an outlet end connected to said dispensing device, a section of reduced internal diameter in said body, and a section of expanded internal diameter on the downstream side of said section of reduced internal diameter, to produce a lowered pressure throat section in said tubular body when said permeate flows through said tubular body from said inlet end to said outlet end, said lowered pressure throat section of said tubular body communicating with said sensing conduit whose contained liquid pressure actuates said control means for said automatic valve;
   d. whereby opening said permeate dispensing device to dispense permeate from said storage tank causes flow of said permeate through said constricted passageway device causing temporary reduction of pressure in said sensing conduit and servo opening action of said automatic valve.

2. Reverse osmosis apparatus according to claim 1 in which said constricted passageway device having a lowered pressure throat section is a venturi.

3. Reverse osmosis apparatus according to claim 1 in which said automatic valve comprises a first diaphragm; a second diaphragm which flexes responsive to pressure in said sensing conduit; and means for transmitting force exerted by flexing of said second diaphragm to cause corresponding flexing of said first diaphragm to open and close the opening in a feed water supply tube in a chamber of said automatic valve.

4. Reverse osmosis apparatus according to claim 3 in which the effective area of said first diaphragm is about twice the effective area of said opening in said feed water supply tube, and the effective area of said second diaphragm is about twice the effective area of said first diaphragm.

5. An automatic valve, for controlling the introduction of pressurized feed water into a pressure resistant container housing a semipermeable membrane cartridge, the permeate from said semipermeable membrane cartridge being temporarily stored in a storage tank under pressure rising with introduction of said permeate thereinto and falling with withdrawal of said permeate therefrom through a permeate dispensing device; in which the improvement comprises;
   a. a body having a first chamber into which said feed water is introduced through a feed water supply tube opening, said first chamber having an outlet for connection to said pressure resistant container;
   b. a first flexible, impermeable diaphragm sealing an end of said first chamber and adapted to close and open said feed water supply tube opening by contact with and release there from of one of the surfaces of said first diaphragm when said first diaphragm is flexed by a force bearing against its opposite surface;
   c. a second chamber in said body having an end sealed by a second flexible impermeable diaphragm of effective area greater than that of said first diaphragm and communicating with a sensing conduit connected to the interior of said storage tank in which permeate is stored; and,
   d. means for transmitting force between said first flexible impermeable diaphragm and said second flexible impermeable diaphragm to cause flexing of said first flexible impermeable diaphragm and opening and closing of said feed water tube opening in said first chamber of said valve body responsive to pressure in said sensing conduit connected to the interior of said storage tank in which permeate is stored.

6. An automatic valve according to claim 5 in which said means for transmitting force between said first and second flexible impermeable diaphragms are mechanical.

7. An automatic valve according to claim 6 in which said mechanical means comprise a pushrod having a small end to contact the surface of said first flexible impermeable diaphragm and a larger end to contact said second flexible impermeable diaphragm.

8. An automatic valve according to claim 7 in which said pushrod is freely floating in a compartment between said first flexible impermeable diaphragm and said second flexible impermeable diaphragm.

* * * * *